US010296492B2

(12) United States Patent
Mason et al.

(10) Patent No.: US 10,296,492 B2
(45) Date of Patent: May 21, 2019

(54) DATABASE BULK LOAD TOOL

(71) Applicant: BANK OF AMERICA CORPORATION, Charlotte, NC (US)

(72) Inventors: Nicholas W. Mason, Jacksonville, FL (US); Neelam Rungta Chaudhry, New Delhi (IN); Rajesh Sharma, New Delhi (IN); Elizabeth M. Gunter, Bloomfield, CT (US); Sargam V. Sodhi, New Delhi (IN); Kapil Jolly, Gurgaon (IN); Prerna Srivastava, Hyderabad (IN); Jeanette E. Graham, Crystal Lake, IL (US)

(73) Assignee: Bank of America Corporation, Charlotte, NC (US)

( * ) Notice: Subject to any disclaimer, the term of this patent is extended or adjusted under 35 U.S.C. 154(b) by 397 days.

(21) Appl. No.: 15/167,402

(22) Filed: May 27, 2016

(65) Prior Publication Data

US 2017/0344574 A1 Nov. 30, 2017

(51) Int. Cl.
G06F 16/00 (2019.01)
G06F 16/16 (2019.01)
G06F 16/13 (2019.01)
G06F 16/11 (2019.01)

(52) U.S. Cl.
CPC .......... G06F 16/166 (2019.01); G06F 16/116 (2019.01); G06F 16/13 (2019.01)

(58) Field of Classification Search
CPC ......... G06F 17/30123; G06F 17/30076; G06F 17/30091; G06F 16/166; G06F 16/116; G06F 16/13
USPC ........................................................ 707/741
See application file for complete search history.

(56) References Cited

U.S. PATENT DOCUMENTS

| 6,173,376 | B1 * | 1/2001 | Fowler | G06F 11/1464 |
| | | | | 711/162 |
| 6,985,901 | B1 | 1/2006 | Sachse et al. | |
| 2005/0033774 | A1 * | 2/2005 | Brentano | G06Q 30/06 |
| 2007/0016613 | A1 * | 1/2007 | Foresti | G06Q 10/107 |

FOREIGN PATENT DOCUMENTS

| WO | WO-9707468 A1 * | 2/1997 | ............ G06Q 40/04 |
| WO | WO-9900958 A1 * | 1/1999 | ............ G06F 21/41 |

* cited by examiner

Primary Examiner — Evan Aspinwall
(74) Attorney, Agent, or Firm — Michael A. Springs

(57) ABSTRACT

A database load tool includes a user interface, a naming engine, a load engine, and an index engine. The user interface receives a path of a folder storing a plurality of files and an index. The naming engine renames each file of the plurality of files in response to the user interface receiving the path. The load engine loads the plurality of files to a database in response to the user interface receiving the path. The index engine generates a control file for each file of the plurality of files in response to the user interface receiving the path. Each control file includes a file type of the file for the control file and the index. The load engine further loads the control file to the database. Each file of the plurality of files is indexed according to its control file by the database.

12 Claims, 3 Drawing Sheets

DATABASE BULK LOAD TOOL

TECHNICAL FIELD

This disclosure relates generally to a tool for bulk loading a database.

BACKGROUND

Databases store an ever increasing amount of data. Loading data into a database and indexing that data are resource intensive processes.

SUMMARY OF THE DISCLOSURE

According to an embodiment, a database load tool includes a user interface, a naming engine, a load engine, and an index engine. The user interface receives a path of a folder storing a plurality of files and an index. The naming engine renames each file of the plurality of files in response to the user interface receiving the path. The load engine loads the plurality of files to a database in response to the user interface receiving the path. The index engine generates a control file for each file of the plurality of files in response to the user interface receiving the path. Each control file includes a file type of the file for the control file and the index. The load engine further loads the control file to the database. Each file of the plurality of files is indexed according to its control file by the database.

According to another embodiment, a method includes receiving a path of a folder storing a plurality of files and an index and renaming each file of the plurality of files in response to receiving the path. The method also includes loading the plurality of files to a database in response to receiving the path and generating a control file for each file of the plurality of files in response to receiving the path. Each control file includes a file type of the file for the control file and the index. The method further includes loading the control file to the database. Each file of the plurality of files is indexed according to its control file by the database.

According to yet another embodiment, a system includes a naming engine, a load engine, and an index engine. The naming engine renames each file of a plurality of files stored in a folder in response to receiving a path of the folder. The load engine loads the plurality of files to a database in response to receiving the path. The index engine generates a control file for each file of the plurality of files in response to receiving the path. Each control file includes a file type of the file for the control file and a received index. The load engine further loads the control file to the database. Each file of the plurality of files is indexed according to its control file by the database.

Certain embodiments provide one or more technical advantages. For example, an embodiment improves the operation of a database by automatically generating control files for each file loaded to the database. As another example, an embodiment improves the operation of a database by performing a bulk load of data rather than multiple, smaller loads of data. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
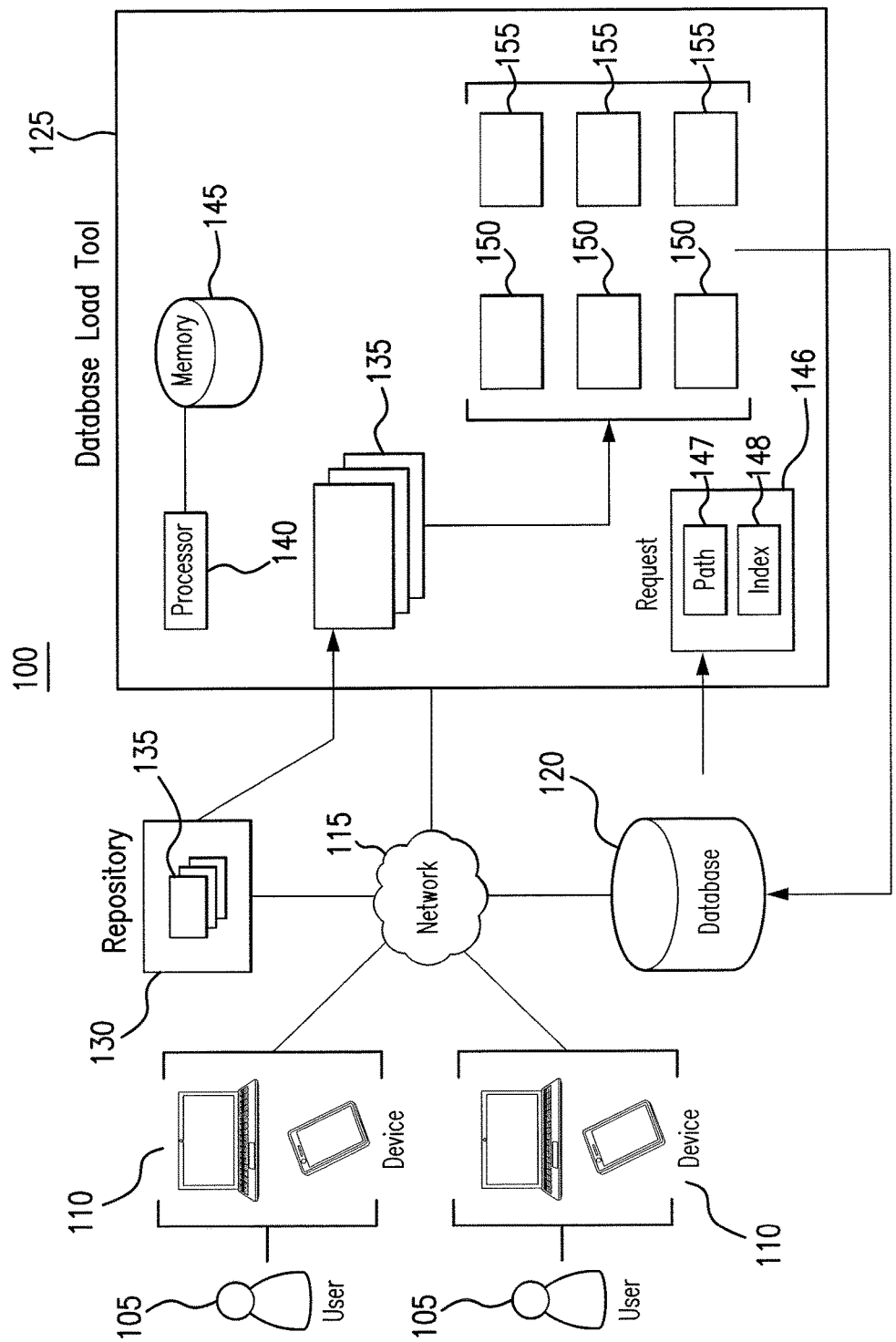
FIG. 1 illustrates a system for bulk loading a database.
Figure 2:
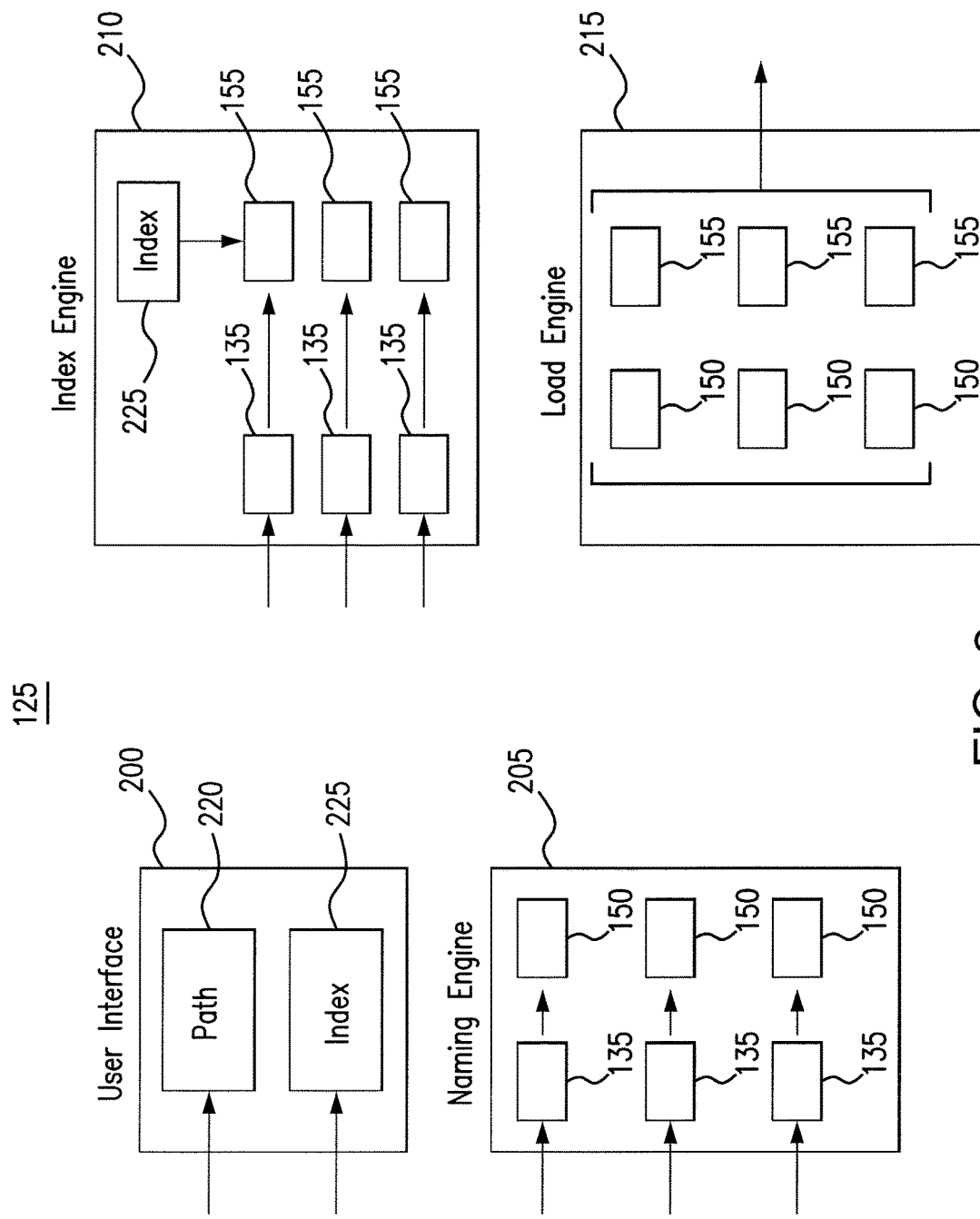
FIG. 2 illustrates the database load tool of the system of FIG. 1 bulk loading a database.
Figure 3:
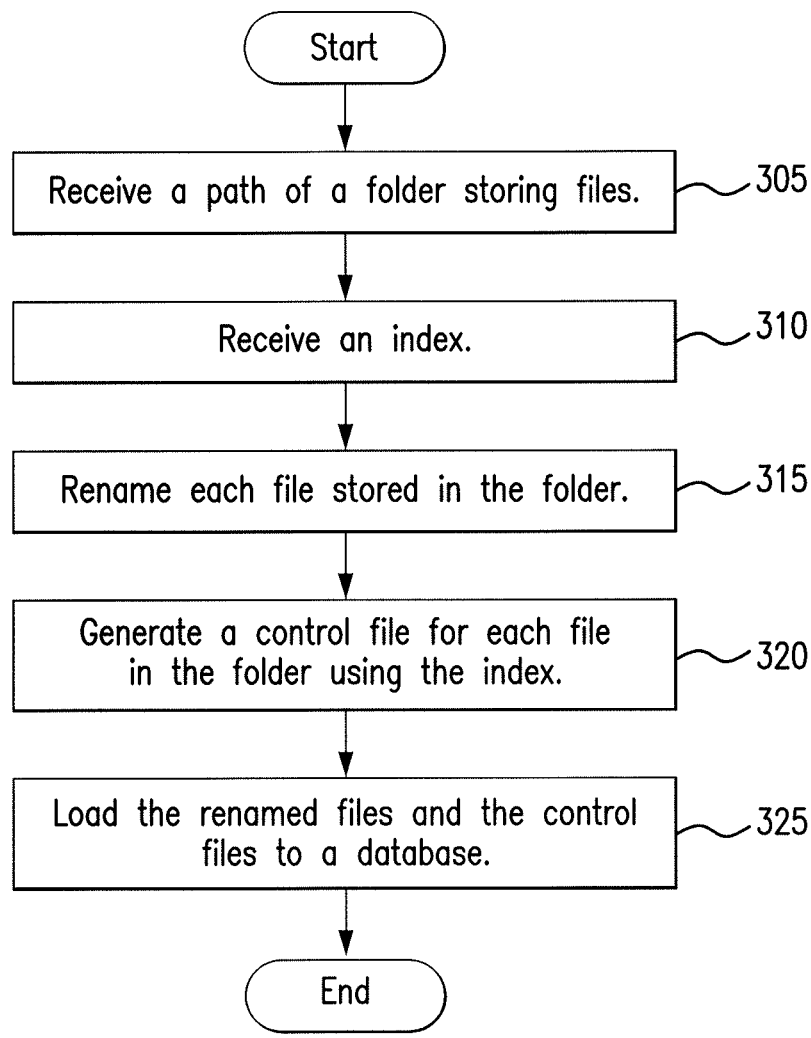
FIG. 3 is a flowchart illustrating a method for bulk loading a database using the system of FIG. 1.

Embodiments of the present disclosure and its advantages are best understood by referring to FIGS. 1 through 3 of the drawings, like numerals being used for like and corresponding parts of the various drawings.

Databases are used to store an ever increasing amount of data. For example, databases are used to store messages, files, user information, etc. Each piece of data must be loaded into the database and indexed in order to be of use to a user. Loading the data into the database allows the data to be available at a later time. Indexing the data allows a user to search for that data in the database. Loading and indexing data in a database is a resource intensive process. For example, loading data to a database and indexing that data consumes more processor and memory resources than retrieving data from the database. If the database has a large number of users and each user concurrently loads data to the database, then the processor and memory resources consumed by these operations can render the database unusable.

This disclosure contemplates a database load tool that performs bulk loads and bulk indexing on a database. Rather than having each user load data to the database, the database load tool retrieves a collection of files and/or data from a repository. This data may have been placed there by each user. The database load tool then reconfigures each file and loads those files to the database. The database load tool also generates a control file for each file and indexes the files in the database based on these control files. This disclosure contemplates the database load tool processing and loading any type of data and/or file to a database such as, for example, messages, data files and/or a stream of information.

In particular embodiments, by using the database load tool, memory and processor resource consumption is reduced by bulk loading and bulk indexing files to a database. In some embodiments, the database load tool improves the operation of a database by automatically generating control files for each file loaded to the database. Additionally, in some embodiments, the database load tool improves the operation of the database by ensuring that files loaded to the database are named and configured consistently. Furthermore, in some embodiments the database load tool improves the operation of a database by performing a bulk load of data rather than multiple smaller loads of data. The database load tool will be described in more detail using FIGS. 1 through 3. FIG. 1 will describe the database load tool generally. FIGS. 2 and 3 will describe the database load tool in more detail.

FIG. 1 illustrates a system 100 for bulk loading a database. As illustrated in FIG. 1, system 100 includes one or more devices 110, a network 115, a database 120, a database load tool 125, and a repository 130. In particular embodiments, database load tool 125 improves the operation of database 120 by bulk loading and bulk indexing data into database 120.

Devices 110 allow users 105 to communicate and/or interact with other components of system 100. For example, users 105 can use devices 110 to load files 135 into repository 130. As another example, users 105 can use devices 110 to initiate a bulk load and/or bulk index process through database load tool 125. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores information provided by components of system 100. Data and/or information can be loaded into database 120 for storage. Loading the data makes it available for later use. Furthermore, the data can be indexed in database 120 so that the data can be searched for quicker retrieval. In existing systems, each user 105 loads his or her own data into database 120. Then, that user 105 indexes his or her own data in database 120. As the number of users 105 grows, the number of load and indexing operations performed on database 120 increases. Furthermore, the number of concurrent operations on database 120 increases. As a result, memory and processor resource consumption is increased as the number of users 105 increase. If a large number of users 105 are loading and indexing data into database 120 concurrently, then database 120 may become slow and/or unusable.

Database load tool 125 reduces processor and memory consumption associated with loading and indexing data in database 120 in some embodiments. As illustrated in FIG. 1, database load tool 125 includes processor 140 and memory 145. This disclosure contemplates processor 140 and memory 145 being configured to perform any of the operations of database load tool 125 described herein.

Processor 140 is any electronic circuitry, including, but not limited to microprocessors, application specific integrated circuits (ASIC), application specific instruction set processor (ASIP), and/or state machines, that communicatively couples to memory 145 and controls the operation of database service tool 125. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory to perform any of the functions described herein. Processor 140 controls the operation and administration of database load tool 125 by processing information received from network 115, device(s) 110, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Repository 130 may be a central location where users 105 can deposit files 135. For example, repository 130 may be a network computer with a shared drive where users 105 can deposit files 135. Users 105 may deposit files 135 by simply copying and pasting and/or moving files 135 to repository 130. In particular embodiments, users 105 do not need to perform any further operations on files 135 to prepare files 135 to be loaded and/or indexed in database 120.

Database load tool 125 may receive a request 146 indicating that a bulk load and/or a bulk index should be performed. Request 146 may indicate a location of files 135 in repository 130. For example, request 146 may indicate a path 147 of a folder in which files 135 are stored in repository 130. Furthermore, request 146 may include an index 148. Index 148 may be used to index files 135 after files 135 are loaded into database 120.

In response to receiving request 146, database load tool 125 retrieves files 135 from repository 130. Then, database load tool 125 configures files 135 to be loaded to database 120. For example, database load tool 125 may rename each file 135 to produce files 150. Then, database load tool 125 may load files 150 into database 120. In particular embodiments, the files may be renamed according to index 148 and/or another parameter specified by request 146. In some embodiments, database load tool 125 may perform other tagging and configuring of files 135 to produce files 150.

Database load tool 125 may also generate a control file 155 for each file 150. Each control file 155 includes information about a file 150. For example, control file 155 may include a file type of file 150. Furthermore, control file 155 may include index 148. In particular embodiments, control file 155 includes a file size of file 150, a filename of file 150 or file 135, a batch name associated with the bulk upload of files 150, a user ID associated with a user 105 that sent request 146, a timestamp associated with the bulk load and/or the bulk index, and/or any other appropriate information. Database load tool 125 then loads each control file 155 to database 120. Each file 150 is indexed in database 120 according to a control file 155. As a result, each file 150 may be searched and/or queried based on information included in its control file 155.

In particular embodiments, by bulk loading files 150 and by automatically generating and bulk loading control files 155 to database 120, database load tool 125 reduces the memory and processor load needed to load files to database 120. Furthermore, database load tool 125 removes the burden of having each user 105 load his or her own files 135 to database 120 and to individually index each file 135 in database 120.

In certain embodiments, a file 135 may be an email message. The control file 155 for the email message may include a portion of a subject line of the email message and a timestamp indicating when the email message was loaded to database 120. In this manner, the email messages may be searched based on its subject line.

In some embodiments, database load tool 125 further verifies that each file 150 was uploaded to database 120. If an upload fails, then database load tool 125 may alert a user 105 that the upload failed.

In particular embodiments, database load tool 125 communicates an alert to users 105 indicating various issues encountered by database load tool 125. For example, database load tool 125 may communicate an alert indicating that there are no files 135 stored in a folder of repository 130 indicated by path 147. As another example, database load tool 125 may communicate an alert indicating that an upload of file 150 failed. For example, the alert may indicate that a file 135 or 150 is open and therefore file 150 cannot be loaded into database 120.

In particular embodiments, database load tool 125 implements a delay between uploads of files 150. For example, after database load tool 125 uploads a file 150 to database 120, database load tool 125 may wait a predefined period of time before uploading a second file 150 to database 120. In this manner, database load tool 125 allows database 120 to finish the loading process of the first file 150 before sending another request to database 120.

FIG. 2 illustrates the database load tool 125 of the system 100 of FIG. 1 bulk loading a database. As illustrated in FIG. 2, database load tool 125 includes a user interface 200, a naming engine 205, an index engine 210, and a load engine 215. In particular embodiments, by using database load tool 125, the operation of a database may be improved by bulk loading and/or bulk indexing files to the database.

User interface 200 may be any interface provided to a user through which the user can interact with database load tool 125. For example, database load tool 125 may provide user interface 200 on a remote device. As another example, database load tool 125 may provide user interface 200 on a local device. A user may use user interface 200 to provide input to database load tool 125. For example a user may use user interface 200 to provide a path 220 and an index 225 to database load tool 125. An example algorithm for user interface 200 is as follows: wait for input from a user; receive a path from the user; receive an index from the user. In particular embodiments, path 220 and index 225 may be included in a request sent by the user.

Naming engine 205 receives files 135 and renames them to produce files 150. Database load tool 125 may have retrieved files 135 in response to receiving path 220 and index 225 from the user. Database load tool 125 may have retrieved files 135 from a location indicated by path 220. After receiving files 135, naming engine 205 renames each file 135 to produce file 150. Naming engine 205 may rename files 135 based on index 225 and/or another parameter provided by a user through user interface 200. Naming engine 205 may rename files 135 in response to receiving path 220 in index 225 from the user. In particular embodiments, by renaming files 135, naming engine 205 prepares files 135 to be loaded into a database. An example algorithm for naming engine 205 is as follows: wait for files 135; receive files 135; rename files 135 to produce files 150 based on index 225.

Index engine 210 uses files 135 and index 225 to generate control files 155 for each file 135. Control files 155 may be later used to search for files 150 in the database. This disclosure contemplates control files 155 including any appropriate information about files 135 and/or files 150. For example, control files 155 may include a file type for file 150, index 225, a file name of file 150 and/or file 135, a file size, a timestamp, and/or a batch name. In particular embodiments, index engine 210 generates control files 155 in response to user interface 200 receiving path 220 and index 225 from a user. An example algorithm followed by index engine 210 is as follows: wait for files 135; wait for index 225; receive files 135; receive index 225; generate control files 155 based on files 135 and index 225.

Control files 155 may be used later to search files 150 in the database. For example, information in control files 155 may be analyzed and searched by a database rather than searching information contained in files 150. Because control files 155 tend to contain less information than files 150, it is conserves processor and memory resources to search information in control files 155 rather than in files 150. In particular embodiments, search results contain information in control files 155. A user may review that information to determine which file 150 to retrieve from the database.

Load engine 215 loads files 150 and control files 155 to a database. After receiving files 150 and control files 155 from naming engine 205 and index engine 210, load engine 215 loads files 150 and control files 155 to a database. An example algorithm for load engine 215 is as follows: wait for files 150 from naming engine 205; wait for control files 155 from index engine 210; receive files 150 from naming engine 205; receive control files 155 from index engine 210; open a connection with a database; load files 150 and control files 155 over the connection to the database.

In particular embodiments, database load tool 125 includes a verification engine that verifies whether each file 150 was loaded to the database. An example algorithm for the verification engine is as follows: wait for load engine 215 to load files 150 to the database; determine whether a file 150 was loaded unsuccessfully to the database; if the file was unloaded unsuccessfully determine that the upload failed.

In particular embodiments, database load tool 125 includes an alert engine that communicates alerts to a user. This disclosure contemplates the alerts indicating any appropriate information. For example, the alerts may indicate that an upload of file 150 failed. As another example, the alert may indicate that a location indicated by path 220 does not include any files 135. As yet another example, an alert may indicate that a file 135 and/or a file 150 are open and therefore cannot be uploaded to the database. An example algorithm for the alert engine is as follows: wait for an event trigger from a component of database load tool 125; receive the event trigger; analyze the event trigger to determine which alert to communicate to the user; open a connection with the user; communicate the alert to the user.

In particular embodiments, load engine 215 is configured to wait a predefined period of time between uploads of files 150 and/or control files 155. By waiting for the predefined period of time, load engine 215 provides the database with enough time to complete a load procedure before sending another upload procedure to the database.

FIG. 3 is a flowchart illustrating a method 300 for bulk loading a database using the system 100 of FIG. 1. In particular embodiments, database load tool 125 performs method 300. By performing method 300, database load tool 125 improves the operation of a database by reducing the processor and memory load used to load and index files in the database.

Database load tool 125 begins by receiving a path of a folder storing files in step 305. Database load tool 125 then receives an index in step 310. In step 315, database load tool 125 renames each file stored in the folder. Then, database load tool 125 generates a control file for each file in the folder using the index in step 320. Database load tool 125 loads the renamed files and the control files to a database in step 325.

Modifications, additions, or omissions may be made to method 300 depicted in FIG. 3. Method 300 may include more, fewer, or other steps. For example, steps may be performed in parallel or in any suitable order. While discussed as database load tool 125 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A database load tool comprising:
a user interface configured to receive a path of a folder storing a plurality of files and an index;
a naming engine configured to rename each file of the plurality of files in response to the user interface receiving the path;
a load engine configured to:
load the plurality of files to a database in response to the user interface receiving the path; and
wait a predefined period of time after uploading a first file of the plurality of files before uploading a second file of the plurality of files;
an index engine configured to generate a control file for each file of the plurality of files in response to the user interface receiving the path, each control file comprising:
a file type of the file for the control file; and
the index, wherein the load engine is further configured to load the control file to the database; and
an alert engine configured to:
analyze a first event trigger to determine that there are no files stored in a folder indicated by a received second path;
in response to determining that there are no files stored in the folder indicated by the received second path, communicate a first alert to a user via the user interface, the first alert indicating that there are no files stored in the folder indicated by the received second path;
analyze a second event trigger to determine that a third file of the plurality of files is open before the load engine uploads the third file to the database; and
in response to determining that the third file of the plurality of files is open before the load engine uploads the third file to the database, communicate a second alert to the user via the user interface, the second alert indicating that the third file of the plurality of files is open before the load engine uploads the third file to the database;
wherein each file of the plurality of files is indexed according to its control file by the database.

2. The database load tool of claim 1, wherein:
a first file of the plurality of files is an e-mail message; and
the control file for the first file further comprises a portion of a subject line of the e-mail message and a timestamp indicating when the first file was loaded to the database.

3. The database load tool of claim 1, further comprising a verification engine configured to verify that each file of the plurality of files was uploaded to the database.

4. The database load tool of claim 1, wherein the control file further comprises the filename.

5. A method comprising:
receiving a path of a folder storing a plurality of files and an index;
renaming each file of the plurality of files in response to receiving the path;
loading the plurality of files to a database in response to receiving the path;
waiting a predefined period of time after uploading a first file of the plurality of files before uploading a second file of the plurality of files;
generating a control file for each file of the plurality of files in response to receiving the path, each control file comprising:
a file type of the file for the control file; and
the index;
loading the control file to the database, wherein each file of the plurality of files is indexed according to its control file by the database;
analyzing a first event trigger to determine that there are no files stored in a folder indicated by a received second path;
in response to determining that there are no files stored in the folder indicated by the received second path, communicating a first alert to a user via a user interface, the first alert indicating that there are no files stored in the folder indicated by the received second path;
analyzing a second event trigger to determine that a third file of the plurality of files is open before the load engine uploads the third file to the database; and
in response to determining that the third file of the plurality of files is open before the load engine uploads the third file to the database, communicating a second alert to the user via the user interface, the second alert indicating that the third file of the plurality of files is open before the load engine uploads the third file to the database.

6. The method of claim 5, wherein:
a first file of the plurality of files is an e-mail message; and
the control file for the first file further comprises a portion of a subject line of the e-mail message and a timestamp indicating when the first file was loaded to the database.

7. The method of claim 5, further comprising verifying that each file of the plurality of files was uploaded to the database.

8. The method of claim 5, wherein the control file further comprises the filename.

9. A system comprising:
a naming engine configured to rename each file of a plurality of files stored in a folder in response to receiving a path of the folder;
a load engine configured to:
load the plurality of files to a database in response to receiving the path; and wait a predefined period of time after uploading a first file of the plurality of files before uploading a second file of the plurality of files;

an index engine configured to generate a control file for each file of the plurality of files in response to receiving the path, each control file comprising:
  a file type of the file for the control file; and
  a received index, wherein the load engine is further configured to load the control file to the database; and an alert engine configured to:
  analyze a first event trigger to determine that there are no files stored in a folder indicated by a received second path;
  in response to determining that there are no files stored in the folder indicated by the received second path, communicate a first alert to a user via a user interface, the first alert indicating that there are no files stored in the folder indicated by the received second path;
  analyze a second event trigger to determine that a third file of the plurality of files is open before the load engine uploads the third file to the database; and
  in response to determining that the third file of the plurality of files is open before the load engine uploads the third file to the database, communicate a second alert to the user via the user interface, the second alert indicating that the third file of the plurality of files is open before the load engine uploads the third file to the database;

wherein each file of the plurality of files is indexed according to its control file by the database.

10. The system of claim 9, wherein:
  a first file of the plurality of files is an e-mail message; and
  the control file for the first file further comprises a portion of a subject line of the e-mail message and a timestamp indicating when the first file was loaded to the database.

11. The system of claim 9, further comprising a verification engine configured to verify that each file of the plurality of files was uploaded to the database.

12. The system of claim 9, wherein the control file further comprises the filename.

* * * * *